US009710408B2

(12) United States Patent
Veal et al.

(10) Patent No.: US 9,710,408 B2
(45) Date of Patent: *Jul. 18, 2017

(54) SOURCE CORE INTERRUPT STEERING

(71) Applicant: Intel Corporation, Santa Clara, CA (US)

(72) Inventors: Bryan E. Veal, Beaverton, OR (US); Annie Foong, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 13/681,706

(22) Filed: Nov. 20, 2012

(65) Prior Publication Data

US 2013/0080674 A1 Mar. 28, 2013

Related U.S. Application Data

(63) Continuation of application No. 12/641,604, filed on Dec. 18, 2009, now Pat. No. 8,321,615.

(51) Int. Cl.
*G06F 13/24* (2006.01)
*G06F 9/48* (2006.01)

(52) U.S. Cl.
CPC .......... *G06F 13/24* (2013.01); *G06F 9/4812* (2013.01)

(58) Field of Classification Search
CPC .......... G06F 2213/2416; G06F 13/374; G06F 13/00; G06F 2213/2412
USPC .................. 710/260–269, 200, 240–244
See application file for complete search history.

(56) References Cited

U.S. PATENT DOCUMENTS

| 7,913,018 | B2 | 3/2011 | Zmudzinski |
| 2008/0086575 | A1 | 4/2008 | Foong et al. |
| 2009/0006521 | A1 | 1/2009 | Veal |
| 2009/0037932 | A1 | 2/2009 | Clark |
| 2009/0198850 | A1 | 8/2009 | Suzuki |
| 2010/0274941 | A1 * | 10/2010 | Wolfe .......................... 710/269 |
| 2011/0087815 | A1 | 4/2011 | Kruglick |

OTHER PUBLICATIONS

Bryan Veal, et al., "PICNIC: Prototyping Tomorrow's Functionality Using Today's NICs," Oct. 2009, pp. 1-8.
Windows Hardware and Driver Central, "Scalable Networking: Eliminating the Receive Processing Bottleneck—Introducing RSS," Apr. 14, 2004, pp. 1-17.
Bryan Veal, et al, "PICNIC: Prototyping Tomorrow's Functionality Using Today's NICs," Power Point Presentation, pp. 1-22.
Windows, "Receive-Side Scaling Enhancements in Windows Server 2008," Nov. 5, 2008, pp. 1-18.
PCI Local Bus Specification Revision 2.3, "MSI-X," Jun. 10, 2003, pp. 1-23.

(Continued)

*Primary Examiner* — Tim T Vo
*Assistant Examiner* — Kim T. Huynh
(74) *Attorney, Agent, or Firm* — Trop, Pruner & Hu, P.C.

(57) ABSTRACT

An embodiment of the invention includes (i) receiving a core identifier that corresponds with a processor source core; (ii) receiving an input/output request, produced from the source core, that is associated with the core identifier; (iii) and directing an interrupt, which corresponds to the request, to the source core based on the core identifier. Other embodiments are described herein.

20 Claims, 7 Drawing Sheets

(56) References Cited

OTHER PUBLICATIONS

IRQ Balance, "IRQBALANCE—handholding your interrupts for power and performance," pp. 1-4.
msdn, Microsoft Corporation, "Windows Driver Kit: Network Devices and Protocols, Introduction to Receive-Side Scaling," 2009, pp. 1-3.
SCSI-2 Specification, (http://ldkelley.com/SCS12/SCS12.html), Chapter 6—Logical Characteristics, pp. 1-30 and Chapter 7—SCSI Commands and Status, pp. 1-20.

* cited by examiner

SOURCE CORE INTERRUPT STEERING

This application is a continuation of U.S. patent application Ser. No. 12/641,604 filed Dec. 18, 2009, the content of which is hereby incorporated by reference.

BACKGROUND

Advancements with multi-core processors and memory technologies (e.g., non-volatile memory (NVM) and solid state disks (SSDs) systems) enable information to be delivered among and within systems with increasing speed. However, these advances have not been optimized because, for example, storage input/output (I/O) throughput may be bottlenecked by interrupt processing.

Storage controllers help direct interrupts within systems and thus contribute to the interrupt processing bottleneck. Storage controller drivers direct interrupts by, for example, programming an I/O hub (IOH) or statically setting the controller's message signal interrupt (MSI) or message signal interrupt extended (MSI-X) control registers. Doing so enables the direction of interrupts on a per device basis. For example, the IOH may be set to a fixed-mode policy where interrupts are directed to a specific core. However, this may result in a single core becoming saturated by interrupt processing. Additionally, because the rest of the processing happens on another core, inter-processor interrupt (IPI) overhead is incurred.

To mitigate the saturation issue, the IOH can direct interrupts by spreading interrupts randomly or in a round-robin fashion to multiple processor cores. However, spreading interrupts can be problematic because servicing an I/O interrupt by a core different from where the corresponding request originated can cause contention and latency between the cores due to, for example, the mismatch of request/response processing contexts. The mismatch probability only increases with the number of processor cores.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

In the following description, numerous specific details are set forth. However, it is understood that embodiments of the invention may be practiced without these specific details. Well-known circuits, structures and techniques have not been shown in detail to avoid obscuring an understanding of this description. References to "one embodiment", "an embodiment", "example embodiment", "various embodiments" and the like indicate the embodiment(s) so described may include particular features, structures, or characteristics, but not every embodiment necessarily includes the particular features, structures, or characteristics. Further, some embodiments may have some, all, or none of the features described for other embodiments. Also, as used herein "first", "second", "third" describe a common object and indicate that different instances of like objects are being referred to. Such adjectives are not intended to imply the objects so described must be in a given sequence, either temporally, spatially, in ranking, or in any other manner.

Figure 1:
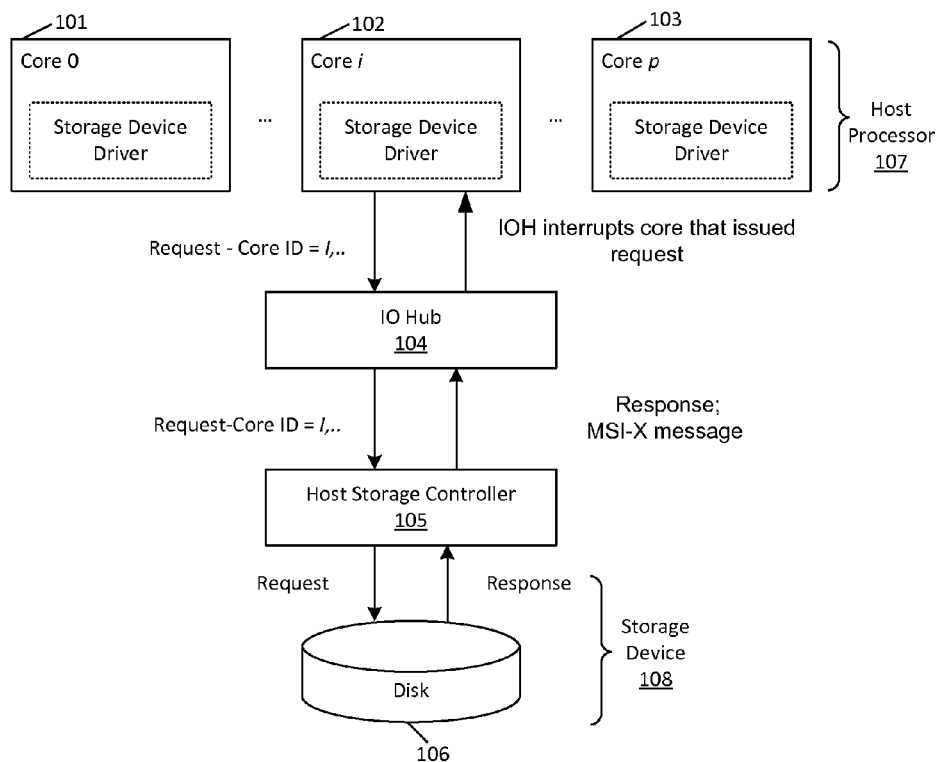
FIG. 1 illustrates an embodiment of a host processor and storage device system.

FIG. 1 includes a schematic block diagram of an embodiment of the invention. Processor cores 101, 102, 103 are included in one or more processors. A request is generated from, for example, core 102. The request is transmitted to IOH 104 and then to host storage controller 105. Controller 105 steers the requested information and interrupt, which corresponds with the request from core 102, back to IOH 104 and core 102 (the "source core") from where the request originated. In an embodiment, controller 105 does so by embedding a Core-ID in the request from core 102.

In an embodiment "Core-ID" refers to an address offset, logical handle, or the like from which a platform, including hardware and software, can determine the identity of the source core (e.g., core 102). Completing I/O processing on the source core, by sending an interrupt to the source core from which its associated request originated, has advantages. First, it "affinitizes" I/O processing to the thread that issued the I/O request. This promotes context cache hits and reduces or eliminates additional IPIs required to, for example, wake processes blocked (e.g., via I/O blocking) on a different core. This may maintain processing efficiency (e.g., clocks per I/O request) as core count increases. Second, embodiments of the technique load-balance I/O interrupts and I/O processing. Thus, if the OS or the like properly load balances application threads then properly balanced interrupt and I/O processing will follow.

The system of FIG. 1 may operate in conjunction with MSI and MSI-X messages. Regarding conventional MSI technology, MSI is a feature that enables a device function to request service by writing a system-specified data value to a system-specified address using, for example, a Peripheral Components Interconnect (PCI) double word (DWORD) memory write transaction. The address specifies the message destination and the data specifies the message. System software may initialize the message destination and the message during device configuration, allocating one or more non-shared messages to each MSI capable function. For example, MSI may be an interrupt-generation mechanism that enables a PCI device to send an inbound memory write on its PCI bus to the processor fabric (e.g. front side bus (FSB), Quick-path interconnect (QPI)). MSI-X is an enhancement to MSI. MSI and MSI-X are described in PCI Local Bus Specification, Rev. 3.0. MSI and MSI-X each allow a device to have multiple interrupt vectors. In MSI and MSI-X, a vector includes address and data.

I/O devices capable of using MSI-X may use an MSI-X Table to map processor cores (represented by the Message Address field) to interrupt vectors (specified in the Message Data field). The MSI-X Table is persistently stored in registers on the storage device which is configured and updated by the host—either by the OS, by a program (e.g. irqbalance in Linux), or by the user. An entry in the MSI-X table constitutes a message. Choosing a message in the MSI-X Table and sending it over the PCI bus will raise the message's interrupt vector on the message's processor core. For example, a NIC supporting Receive-Side Scaling may use a hash computation on packet headers to choose an MSI-X Table entry. As another example, a storage device supporting embodiments of the invention may choose an entry specified by the I/O request. As used herein "storage device" may include, without limitation, a storage controller, memory (e.g., SSD), storage controller included in a package with memory, storage controller and host bus adaptor included in a package with memory, and the like.

With the above discussion of a Core-ID and conventional MSI and MSI-X technologies, the embodiment in FIG. 1 is now addressed with regard to how Core-IDs can be used with MSI/MSI-X technology. A "storage I/O" may consist of a request (e.g., Read command) and an associated response (e.g., read data). Host controllers that support multiple outstanding I/O commands (e.g., tagged command queuing (TCQ)) may see more than one response return for the multiple requests still outstanding. In order to know which request a particular response is associated with, the host controller may maintain an association between the request and the resulting response. One possible implementation is a linked-list or table of contexts identified by a tag. However, in one embodiment a Core-ID is used to make this affiliation between request and resulting response.

Specifically, in an embodiment of the invention a storage device driver for any of host cores 101, 102, 103 may set the storage device's MSI-X message capability to direct-delivery mode, placing IOH 104 in a mode that routes interrupts as directed by the storage device message address. A storage device driver may add a Core-ID, which identifies the platform source core, to the I/O command data structure it submits to the storage controller. Controller 105 may store the Core-ID of each outstanding request in storage device local memory to derive which core to interrupt in response to the request. After controller 105 stores the Core-ID in storage device 108 local memory, controller 105 then transfers data and/or status from storage device 108, which may include disk 106, to host memory (e.g., via direct memory access) and interrupts the source core (core 102 in this example) of host processor 107.

Figure 2A:
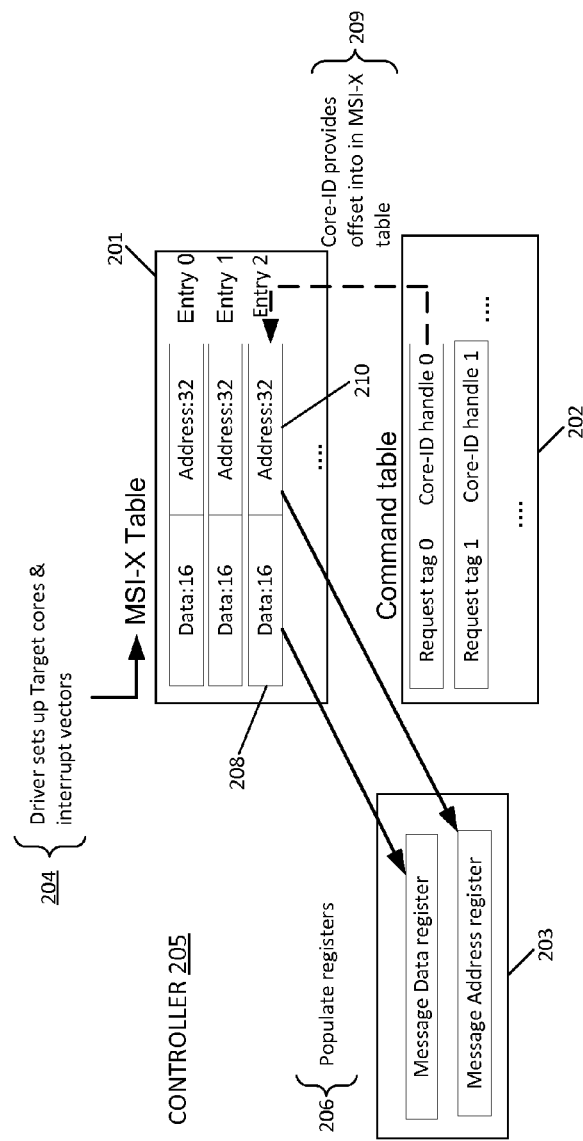
FIG. 2a illustrates an embodiment of a method for populating controller registers.

FIG. 2a illustrates an embodiment of a method for populating controller registers using MSI/MSI-X and Core-ID technologies. In procedure 204 the storage device driver sets up target cores and interrupt vectors in MSI-X Table 201 via memory-mapped I/O (register writes) from host 107 (FIG. 1) to controller 205 when, for example, controller 205 is initialized or reconfigured. Controller 205 includes MSI-X Table 201 and Command Table 202, which further includes several I/O requests, each associated with a Core-ID handle or identifier by the storage device driver. In an embodiment, software or code (e.g., the application, the kernel I/O stack, or the storage device driver) taking part in creating an I/O request, while running on the source core, may add or affiliate the Core-ID to the I/O command. In procedure 209, controller 205 uses one of the Core-ID handles to determine an offset into MSI-X Table 201. Thus, the Core-ID serves as an index for MSI-X Table 201. In this example, "Core-ID handle 0", associated with "Request tag 0", serves as an index pointing to Entry 2 of Table 201, which includes source address 210 and vector 208. Source address 210 has been initialized to reference the same core as Core-ID handle 0. This index may enable host controller 205 to retrieve the information needed to populate the MSI-X address and data fields in the interrupt message. As seen in procedure 206, source address 210 and vector 208 are respectively copied into the message address register message and data register in MSI-X message 203. Controller 205 transfers MSI-X message 203 to host 107 (FIG. 1) to interrupt the source core. Storage controller 205 may thus steer or direct interrupts (and associated I/O processing) correctly to source core (e.g., 102).

Figure 2B:
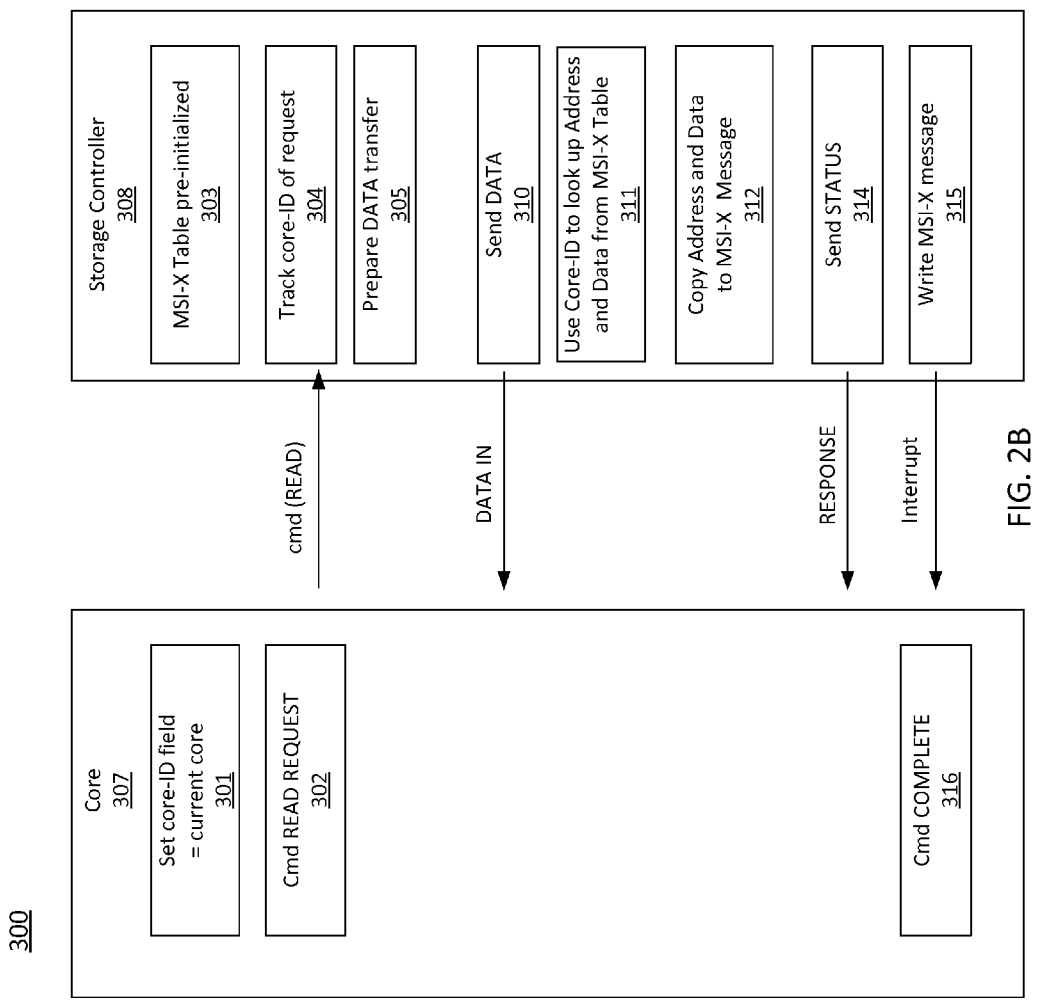
FIG. 2b illustrates an embodiment of a method for a memory read.

FIG. 2b includes an embodiment of the invention concerning an example disk read operation 300. In block 301 the Core-ID field for the request is set to the source core by the storage device driver. In 302, a READ REQUEST command is sent to storage controller 308. Storage controller 308 may already have a pre-initialized MSI-X Table that includes MSI messages complete with vectors (block 303). In block 304 the Core-ID and request is tracked using, for example, Command Table 202 (FIG. 2a). In block 305 a data transfer is prepared. In block 311 the index procedure occurs where the Core-ID serves to look up the MSI-X table entry (e.g., see procedure 209 of FIG. 2a). In block 312 the MSI-X message is determined based on the Core-ID (e.g., see procedure 206 of FIG. 2a). In block 310 requested data or information may be sent to core 307. In block 314 a status message is sent and in block 315 the MSI-X message is sent to core 307. In block 316 the command is completed on the source core. Some of the above procedures may occur in a simultaneous or generally simultaneous fashion. Every procedure in method 300 is not necessarily required in every embodiment of the invention. For example, block 310 may not always be required (e.g., if request is a write request) or may be required more than once (e.g., if request is a read request) depending on nature of the request.

Thus, instead of sending interrupts to an arbitrary core independently of the source core of the request, various embodiments of the invention send interrupts to their respective source processor cores using a Core-ID handle or identifier. Because the Core-ID is associated with a request embodiments of the invention may enable controller resources to be independent from platform cores. Per-request Core-IDs may promote load balancing and scalability with cores.

Figure 3A:
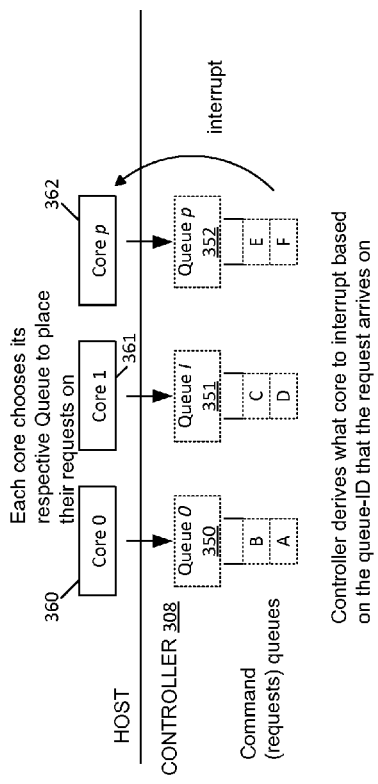
FIG. 3a illustrates an embodiment of a method for allocating requests to controller queues.
Figure 3B:
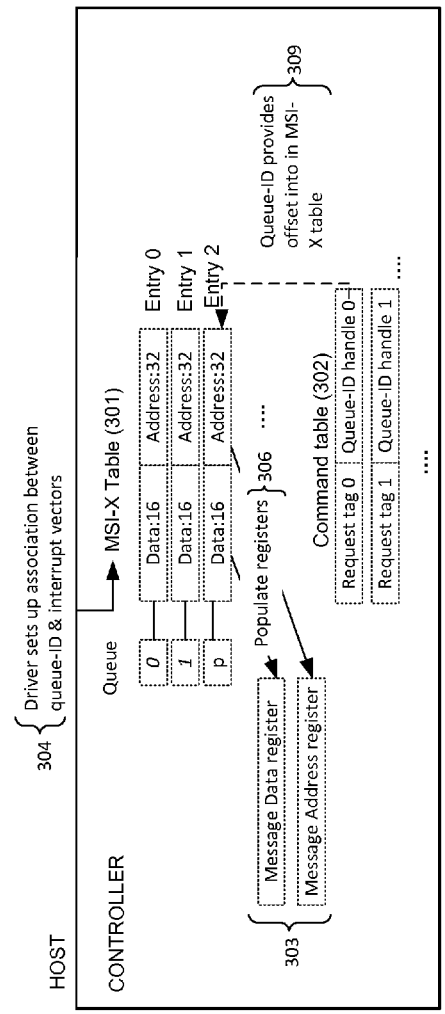
FIG. 3b illustrates an embodiment of a method for populating controller registers.

FIG. 3a illustrates an embodiment of a method for allocating requests to controller queues. In an embodiment, host software may create a set of command queues 350, 351, 352 where each queue is respectively associated with a unique core 360, 361, 362. FIG. 3b illustrates an embodiment of a method for populating controller registers. In procedure 304 controller 308 is initialized and queues 350, 351, 352 are each assigned a unique Queue-ID handle which corresponds to an offset in MSI-X table 301. The mapping of queue-ID handle to core is stored in host memory, and MSI-X table 301 is stored in controller memory. Each MSI-X table entry's address field is set to the address of the core corresponding to the queue. When creating an I/O request, host software may issue the request command queue corresponding to the core on which the software is running. The I/O request is then sent to the storage device and placed in, for example, command table 302.

In one embodiment, controller 308 may be able to identify from which queue an incoming I/O request was generated. For example, commands in different queues may reside in different regions in host memory. Based on where in host memory a command was fetched, the controller may determine to which queue the command belongs.

For an outstanding I/O request, controller 308 may store in command table 302 a request tag uniquely identifying the request (e.g., "request tag 0") and the request's Queue-ID handle (e.g., "Queue-ID handle 0") which identifies an MSI-X table offset (e.g., entry 2). In procedure 309 controller 308 uses the offset to determine the proper entry in the MSI-X table 301. In procedure 306 the Message Data register and Message Address register are respectively populated with the Data and Address contents of the identified MSI-X table entry. Controller 308 then sends the contents of these registers as an MSI message to the IOH. This interrupts the source core from which the I/O request originated.

An embodiment of the invention regarding I/O blocking is now addressed. With conventional blocking I/O techniques control is not returned to the calling program until all requested data is transferred and the I/O transfer runs serially for a specific I/O with respect to the processor work. In an embodiment of the invention, by directing interrupts back to the source core an interrupt handler may execute on the core. The interrupt handler may signal deferred procedure calls, or execute callback functions, that complete the rest of the I/O response on the same core. Threads may be blocked for that specific I/O and may be placed in wait queues assigned to their respective source core. After all data is transferred for an I/O response, the deferred procedure call or callback function may signal the blocking thread to awaken and continue executing on the source core.

Figure 4:
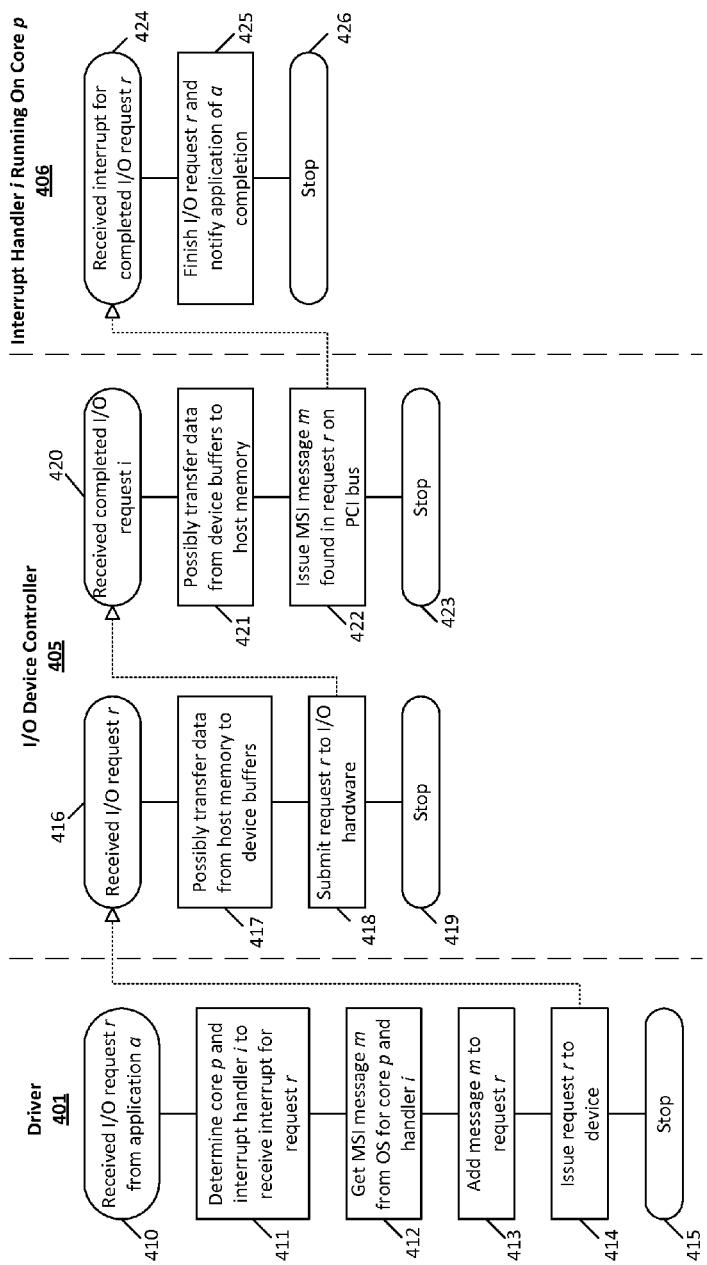
FIG. 4 illustrates a block flow diagram in an embodiment regarding Request-Directed Interrupts.

FIG. 4 includes a method in an embodiment of the invention that uses Request-Directed Interrupts (RDIs). With MSI-X, the OS is responsible for pre-configuring MSI messages and storing them in the MSI-X table on the controller. With RDI, however, the storage device driver may include a complete MSI message as part of each I/O request. The storage device driver is free to choose any valid MSI message, such as a message that will interrupt the source core of a target request. When the storage device is ready to issue an interrupt in response to the request, it is not required to look up a message in the MSI-X Table stored in the controller. Instead, the storage device sends the exact message which was included in the request it received from the storage device driver operating on the host. This removes the storage device's dependence on the MSI-X Table.

Specifically, in one embodiment method 400 concerns storage device driver 401, I/O device controller 405, and interrupt handler 406 running on a core (e.g., 102) in the host (e.g., 107). An operating system (OS) on the host stores an MSI-X message for each core and interrupt handler pair required by the storage device. In block 410 storage device driver 401 receives an I/O request r from application a. In block 411, driver 401 determines core p and associated interrupt handler i will receive an interrupt for request r. Various techniques may be used to make this determination, such as choosing the source core as described above or using round robin techniques. In other words, embodiments discussed in relation to FIGS. 1-3 may be used but other methods for selecting a core to receive an interrupt are included in various embodiments. In block 412 driver 401 obtains MSI message m from OS for core p and handler i. In blocks 413 and 414 driver 401 adds message m to request r and issues request r to the device via controller 405 (which may or may not be included storage device). The storage device driver then stops in block 415.

In block 416 controller 405 receives I/O request r. In block 417 controller 405 transfers requested data from host memory to storage device buffers if, for example, request r is a write request. In block 418 controller 405 submits request r to I/O hardware. Controller 405 may then stop (block 419) until in block 420 it receives a completed I/O request i. In block 421 requested data is transferred from storage device buffers to host memory if, for example, the request is a read request. In block 422 controller 405 issues MSI message m, found in or affiliated with request r, on PCI bus. In block 423 controller 405 stops and in block 424 interrupt handler i receives the interrupt for the completed I/O request r. In block 425 handler i finishes I/O request r and notifies application a of the completion status. In block 426 handler 406 stops.

As seen in FIG. 4, request r is handled without dependence on the MSI-X Table. As such, the number of cores a storage device can interrupt is not limited by the size of the MSI-X Table, which may have a limited capacity. Also, embodiments that do not rely on MSI-X Tables avoid table configuration issues that may introduce error and cost for storage devices using a request-response paradigm (e.g., storage devices). Such configuration issues may arise when, for example, software or a user changes the MSI-X Table forcing the driver to adapt to new core-to-vector mappings. Other configuration issues may arise in response to a request that may not be present in the MSI-X Table. Reconfiguring the table delays issuing the request and may affect outstanding requests that rely on the entry's current value. Embodiments of the invention that wait until just before or after the driver issues an I/O request to determine a message and/or which core should receive the request (instead of relying on preconfigured MSI-X tables) may provide the most current information to make decisions about which core to interrupt in response to the request.

Figure 5:
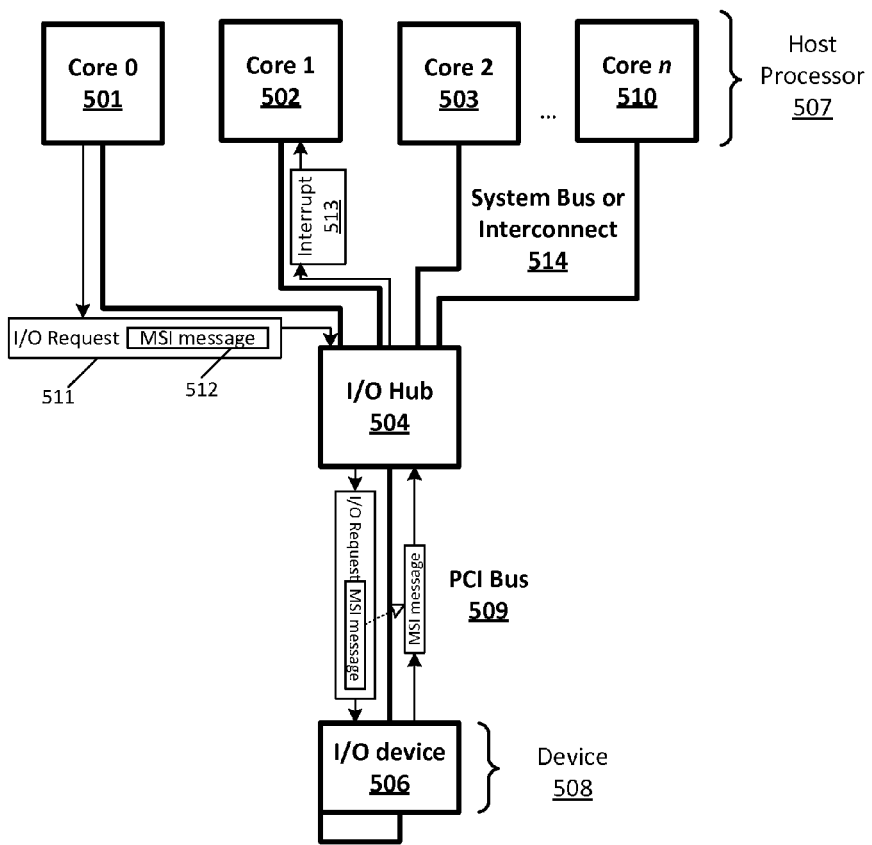
FIG. 5 illustrates an embodiment of a host processor and I/O storage device system.

FIG. 5 includes a method in an embodiment of the invention that uses RDIs to handle an example I/O request. As explained above, when an RDI-enabled driver receives an I/O request it decides which interrupt handler and core should handle the request. In this example, the driver selects core 502 and its associated handler even though the source core is core 501. The driver requests, from the OS, MSI message 512. MSI message 512 includes MSI address and MSI data fields corresponding to core 502 and its interrupt handler. The driver includes message 512 as a field in I/O request 511. The driver issues the request to the storage device 508 via IOH 504. Storage device 508, including I/O storage device 506, receives and handles request 511. Upon completion of the request, storage device 508 sends MSI message 512 (which still includes the same MSI address and MSI data fields corresponding to core 502 and its interrupt handler) over PCI bus 509. The platform hardware handles the MSI message as it would a MSI message generated by the I/O storage device from an MSI or MSI-X table. MSI message 512 interrupts core 502 to execute the driver's interrupt handler. Notably, in some embodiments the driver may request MSI message 512 from something other than the OS (e.g., virtual machine monitor, system software, and the like).

In contrast to the above, conventional I/O storage devices and drivers may choose which core to interrupt, and with which interrupt vector to interrupt the core with, by selecting an entry in an MSI-X Table. Table entries may be configured by the OS, by software, or by the user. Table entries cannot be reconfigured for each I/O request. The storage device or driver may wish to interrupt a specific core in response to an I/O request, but it may not do so if the desired core and vector are not present in the table. The table is a fixed size decided by the storage device's designers. It is not possible to support interrupting more cores on the system than the number of entries in the table. However, as described herein, various RDI embodiments remove the dependency on the MSI-X Table for I/O protocols which follow a request/response paradigm (e.g., storage protocols). Instead of issuing the interrupt message found in an MSI-X Table entry, the storage device may issue the message found in the I/O request itself after it has completed its response to that request. This may give the storage device driver the flexibility to interrupt any core allowed by the operating system. Also, the number of cores supported by RDI is not bound by the size of the MSI-X Table. RDI may promote I/O performance that scales with the number of processor cores on various platforms independently of interrupt hardware resources on the storage device controller because RDI-enabled storage controllers can direct interrupts to any available core, not just cores resourced in the storage device's MSI-X table. RDI-enabled storage controllers give storage device drivers the flexibility to decide the best core to handle the interrupt and specify just before issuing an I/O request which core to interrupt without reconfiguring the MSI-X table.

Hardware support for RDI is now addressed. RDI-enabled hardware may require only minimal logic to extract the MSI message (e.g., verbatim) from the I/O request itself and issue that message as its interrupt. For example, it may use logic similar to existing logic used for extracting an MSI message from an MSI-X table. Embodiments of the method may include new PCI capability structures to handle RDIs or may implement both MSI-X and RDI structures. The new RDI capability structure may contain a new Capability ID which denotes that the storage device is capable of performing RDI. Unlike MSI or MSI-X, the RDI structure need not contain an address or data field or a pointer to an MSI-X Table. Alternatively, RDI capability may be added as an option to conventional MSI or MSI-X hardware and software systems. For example, a bit may be added to the Message Control field of the MSI or MSI-X structure to denote support for RDI. Supporting RDI does not necessarily preclude using standard MSI-X and storage devices may support switching between MSI-X and RDI for backward compatibility. For example, storage devices supporting multiple event types may use MSI-X for non-request/response events, such as requests to change storage device state which do not require acknowledgment or error notices from the storage device which are not issued on response to an event, while using RDI for the request/response events. Hardware changes for RDI may be limited to the I/O storage device controller itself. Since an RDI-capable storage device may generate the same type of interrupt message as MSI or MSI-X, such a system may not require any changes to conventional interconnect hardware or protocols, including PCI, QuickPath, I/O hubs, and APICs.

Embodiments may employ RDI masking. RDI supports interrupt masking (i.e., temporarily disabling individual interrupts) as a method for, as an example, reducing interrupt rates. Specifically, RDI supports masking and unmasking interrupts for individual outstanding I/O requests. As a result, in an embodiment the storage device may generate interrupts for completing unmasked commands but not for masked commands. Also, new I/O requests may be flagged as masked before issuing them to the storage device as long as the corresponding MSI message is masked. Furthermore, when the storage device driver wishes to mask or unmask an MSI message, for each outstanding I/O request containing that message the storage device may write to a mask/unmask flag in a control register on the storage device. Thus, the storage device may check the flag to decide whether to send an interrupt message. In another embodiment, the driver may write a mask/unmask flag and the desired MSI message to a single register on the storage device. The storage device may search all commands that match the message and flag them as masked or unmasked.

In some embodiments the OS or driver may reconfigure the core designation and/or vector of an interrupt message while I/O requests for that interrupt are outstanding. For example, the OS may wish to take a core offline to save power while requests intending to interrupt that processor core are still outstanding. For conventional MSI-X systems reconfiguration may be accomplished by updating entries in the MSI-X Table. RDI systems may handle the situation differently. For example, an RDI system may delay reconfiguration until any outstanding I/O requests, which depend on the previous configuration, are complete. In another embodiment, an RDI compatible storage device may identify a configuration register for each outstanding request that has been targeted to have its MSI message changed. The driver would identify the targeted requests and write the reconfigured messages to the corresponding registers. In another embodiment, the storage device may identify a single register that has the old message and then replace that old message with the newly configured MSI message. The storage device would be responsible for replacing each instance of the old message in outstanding commands with the new message.

OS support for RDI systems will now be addressed. In conventional MSI-X systems the OS may be responsible for mapping interrupt handler vectors into the appropriate core's interrupt descriptor table (IDT) for each entry in the MSI-X Table that the driver wishes to use. Depending on the OS configuration, there may be a global IDT for all cores, an IDT for each core, or groups of cores may share IDTs. For RDI, however, the OS may support a request for entries in the IDTs that are not mapped to MSI-X Table entries. In one embodiment, at setup time the driver may request the OS map IDT entries for each interrupt handler it wishes to run on each core. When the driver is ready to issue a request to the storage device, it may request an MSI message from the OS. The OS may translate the desired Core-ID into an MSI Address value, translate the desired IDT vector into an MSI Data value, and return the MSI message. For conventional MSI-X, the OS tracks the address of each core and uses these addresses to program the address fields in the MSI-X Table when the storage device is initialized. The vector fields are initialized to correspond to the indices IDT entries. However, in an embodiment of the invention an MSI-X Table on the storage device may not be used or required. Instead, the driver may obtain from the OS the address corresponding to the desired Core-ID and the vector corresponding to the entry for the desired interrupt handler in the desired core's IDT. The driver may incorporate this MSI message as part of the request. The OS or user may restrict the storage device to a subset of cores on the system. The OS may identify to the driver the set of cores the storage device is allowed to interrupt. The OS may then deny requests from the driver for MSI messages to disallowed cores. The OS may also expose methods to the user for setting the allowed set of cores for each RDI-enabled storage device. Online changes to the set of allowed cores may be implemented using methods described above.

In one embodiment RDI may save space in the IDT. For example, the OS may store temporary entries in the IDT which are removed after interrupts for outstanding I/O requests arrive. When the driver requests an MSI message from the OS, the OS may create a new entry in the appropriate core's IDT. When the interrupt arrives, the driver may notify the OS to release the IDT entry. RDI may enable a storage device to use only as many IDT entries as it has outstanding requests. To further save space in the IDT, the OS may keep a reference count for each temporary entry. When the driver submits multiple requests for the same core and interrupt handler, the OS may use the same IDT entry and increment the reference counter. When these interrupts arrive, the driver may decrement the reference count for each completed request. The IDT entry is then removed when the count reaches zero.

Various embodiments also enable command coalescing (e.g., SCSI linked commands). Conventional techniques may allow a storage device to combine several I/O requests (possibly issued from different cores) and treat them as a single command. With steered interrupt embodiments, such as those described in relation to FIGS. 1-3, driver logic may select the core it deems most appropriate to handle interrupt and response processing (on behalf of other cores). For example, the driver may choose to steer the linked commands to the source core (e.g., identified using Core-ID embodiments) that issued the last sub-command of the linked commands. In another embodiment, the system may create linked commands only for commands which originate from the same core based on analysis of Core-ID information. Commands originating from different cores may go into different command chains.

Figure 6:
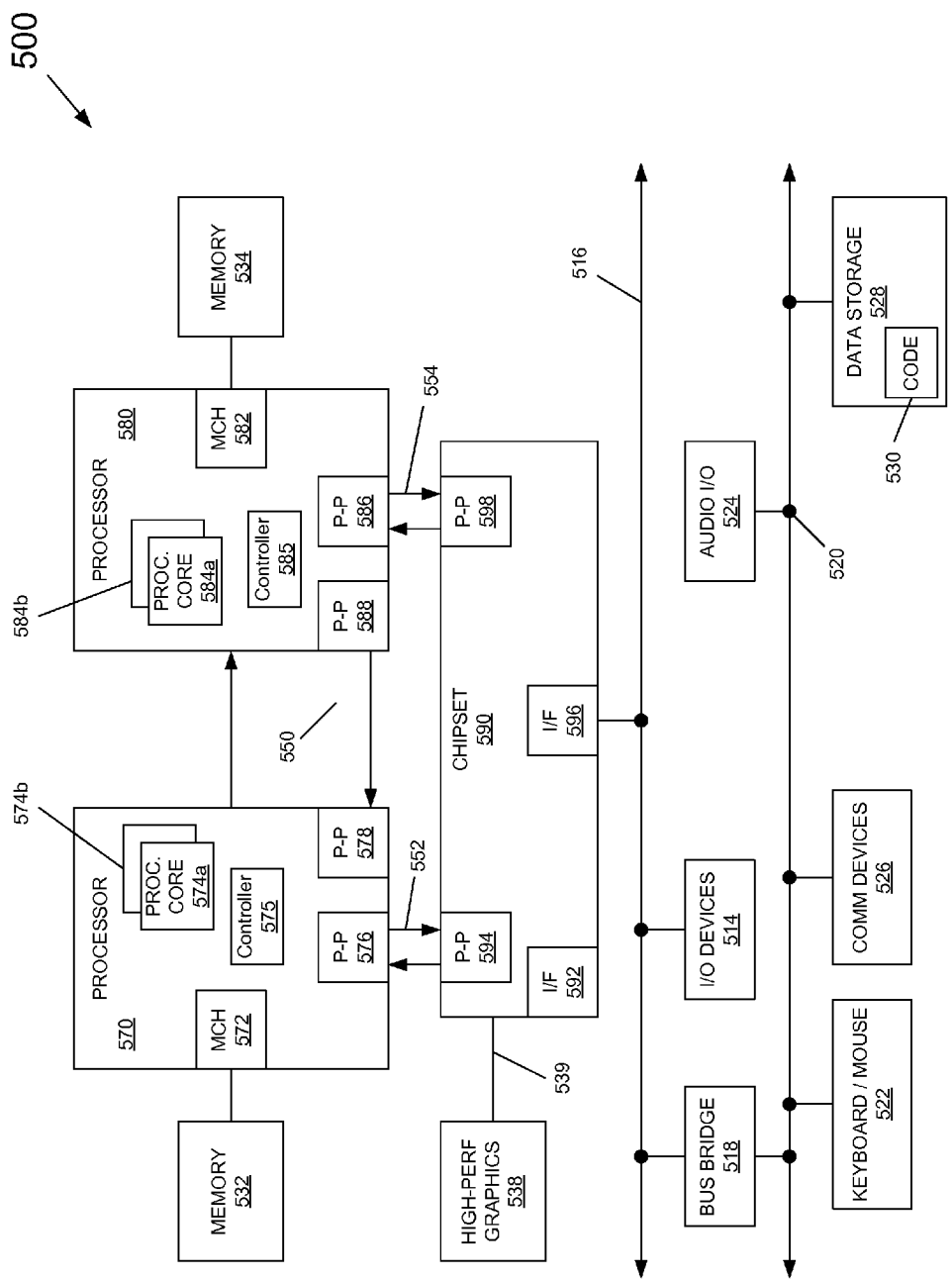
FIG. 6 illustrates a block diagram for a system in an embodiment.

Embodiments may be implemented in many different system types. Referring now to FIG. 6, shown is a block diagram of a system in accordance with an embodiment of the invention. Multiprocessor system 500 is a point-to-point interconnect system and includes a first processor 570 and a second processor 580 coupled via a point-to-point interconnect 550.

The term "processor" may refer to any device or portion of a device that processes electronic data from registers (which are a form of memory) and/or memory to transform that electronic data into other electronic data that may be stored in registers and/or memory. A "computing platform" may comprise one or more processors. Embodiments may operate with one or more multi-processing element processors. A processing element refers to a thread, process, context, logical processor, hardware thread, core, and/or any processing element that utilizes processor resources such as reservation units, execution units, pipelines, and/or higher level caches/memory. A processor may include an integrated circuit (IC) that has other processing elements such as cores or hardware threads. Hardware threads may be included in a core. A core may have logic located on an IC capable of maintaining an independent architectural state where each independently maintained architectural state is associated with some dedicated execution resources. In contrast, a hardware thread may have logic located on an IC capable of maintaining an independent architectural state where the independently maintained architectural states share access to execution resources.

Each of processors 570 and 580 may be multicore processors, including first and second processor cores (i.e., processor cores 574a and 574b and processor cores 584a and 584b), although potentially many more cores or processing elements may be present in the processors. Thus, processor 570 is coupled to cores 574a, 574b as well as cores 584a, 584b. First processor 570 further includes a memory controller hub (MCH) 572 and point-to-point (P-P) interfaces 576 and 578. Similarly, second processor 580 includes a MCH 582 and P-P interfaces 586 and 588. MCH's 572 and 582 couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. Chipset 590 includes P-P interfaces 594 and 598.

Chipset 590 may include interface 592 to couple chipset 590 with a high performance graphics engine 538, by a P-P interconnect 539. Chipset 590 may couple to a first bus 516 via an interface 596. Various I/O devices 514 may be coupled to first bus 516, along with a bus bridge 518 which couples first bus 516 to a second bus 520. Various devices may be coupled to second bus 520 including, for example, keyboard/mouse 522, communication devices 526, and data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. SSDs may include DRAM, EEPROM, a memory bus board, a processor, and a battery card.

References made herein to interrupt may include a signal informing a program that an event has occurred. When a program receives an interrupt signal, it may take a specified action (which can be to ignore the signal). Interrupt signals can cause a program to suspend itself temporarily to service the interrupt. Hardware interrupt signals can come from a variety of sources (e.g., from keystrokes, devices, memory devices) to indicate that some event has occurred. Software interrupts may include signals initiated by programs and may also be referred to, for example, as a trap or an exception. Interrupts may be associated with an interrupt handler that may include code that takes control when the interrupt occurs.

Embodiments of the invention may be described herein with reference to data such as instructions, functions, procedures, data structures, application programs, configuration settings, code, etc. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine readable medium comprising instructions that when executed on a computing device cause the computing device to perform a method comprising:
   receiving a core identifier that corresponds with a source core that is included in a processor;
   receiving an input/output request, produced and originating from the source core, that is associated with the core identifier;
   storing the core identifier in a memory coupled to the processor;
   directing an interrupt, which corresponds to the request, to the source core based on the core identifier;
   wherein the processor is coupled to an additional core and the request includes the core identifier.

2. The at least one medium of claim 1, the method comprising directing the interrupt to the source core, but not the additional core, based on the core identifier.

3. The at least one medium of claim 2, the method comprising directing a message-signaled interrupt message to the source core based on the core identifier.

4. The at least one medium of claim 1, the method comprising determining a message-signaled interrupt address based on the core identifier.

5. The at least one medium of claim 1, the method comprising storing the core identifier in the memory before directing the interrupt to the source core.

6. At least one non-transitory machine readable medium comprising instructions that when executed on a computing device cause the computing device to perform a method comprising:
   receiving an input/output request, produced and originating from a source core, which includes a message-signaled interrupt (MSI) message that corresponds to one of the source core and an additional core; and
   directing an interrupt, which corresponds to the request and the MSI message, to the one of the source core and the additional core based on the MSI message;
   wherein the source core and the additional core are included in a processor.

7. The at least one medium of claim 6, the method comprising directing the interrupt to the one of the source core and the additional core independently of a MSI table.

8. The at least one medium of claim 6, the method comprising changing a MSI vector, which is included in the request, after the request has been sent from the source core.

9. The at least one medium of claim 6, the method comprising directing the MSI message, which includes a MSI address, to the source core.

10. The at least one medium of claim 6, the method comprising directing the interrupt to the source core, but not the additional core, based on the MSI message.

11. The at least one medium of claim 6, the method comprising directing the interrupt to the source core based on the MSI message.

12. The at least one medium of claim 6, the method comprising directing the interrupt to the additional core based on the MSI message.

13. The at least one medium of claim 6, wherein the MSI message includes a MSI address and MSI data.

14. The at least one medium of claim 6, wherein the MSI message is included in a field of the request.

15. The at least one medium of claim 6, the method comprising issuing the MSI message onto a bus before directing the interrupt to the one of the source core and the additional core.

16. At least one non-transitory machine readable medium comprising instructions that when executed on a computing device cause the computing device to perform a method comprising:
   using a first queue identifier (QID) to associate a first controller request queue with a first processor core;
   using a second QID to associate a second controller request queue with a second processor core;
   storing a first input/output (I/O) request, which is produced from the first core and is associated with the first QID, in the first queue based on the first QID; and
   directing a first interrupt, which corresponds to the first request, to one of the first and second cores based on the first QID.

17. The at least one medium of claim 16, the method comprising directing the first interrupt to the first core, but not the second core, based on the first QID.

18. The at least one medium of claim 17, the method comprising directing a message-signaled interrupt (MSI) message, corresponding to the first request, to the first core based on the first QID.

19. The at least one medium of claim 18, the method comprising determining a MSI address based on the first QID, wherein the first and second queues are separably addressable.

20. The at least one medium of claim 16, the method comprising:
   storing a second input/output (I/O) request, which is produced from the second core and is associated with the second QID, in the second queue based on the second QID; and
   directing a second interrupt, which corresponds to the second request, to the second core based on the second QID.

* * * * *